US006975218B2

(12) United States Patent
Madau

(10) Patent No.: US 6,975,218 B2
(45) Date of Patent: Dec. 13, 2005

(54) LANE BASED AUTOMATIC TURN SIGNAL DEACTIVATION

(75) Inventor: Dinu Petre Madau, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 161 days.

(21) Appl. No.: 10/441,212

(22) Filed: May 19, 2003

(65) Prior Publication Data

US 2004/0233051 A1 Nov. 25, 2004

(51) Int. Cl.[7] .............................................. B60Q 1/40
(52) U.S. Cl. ..................... 340/476; 340/435; 340/475; 340/903; 180/167; 701/301
(58) Field of Search ................. 340/476, 475, 340/477, 903, 425.5, 435, 436; 180/167, 180/169; 701/301

(56) References Cited

U.S. PATENT DOCUMENTS

| 4,030,066 A | | 6/1977 | White .......................... 340/476 |
| 4,333,071 A | * | 6/1982 | Kira et al. .................... 340/477 |
| 4,660,020 A | | 4/1987 | Miyamaru et al. ............ 340/477 |
| 5,835,028 A | | 11/1998 | Bender et al. ................ 340/937 |
| 5,982,278 A | | 11/1999 | Cuvelier ....................... 340/436 |
| 6,204,759 B1 | | 3/2001 | Jahnke ......................... 340/476 |
| 6,356,189 B1 | | 3/2002 | Fujimaki ...................... 340/475 |
| 6,370,475 B1 | | 4/2002 | Breed et al. ................. 701/301 |
| 6,433,816 B1 | | 8/2002 | Lee .............................. 348/148 |
| 6,498,570 B2 | * | 12/2002 | Ross ............................ 340/901 |
| 2002/0019703 A1 | | 2/2002 | Levine ......................... 701/301 |
| 2004/0155767 A1 | * | 8/2004 | Hankins ....................... 340/476 |

FOREIGN PATENT DOCUMENTS

| JP | 09039650 | 2/1997 |
| JP | 11342808 | 12/1999 |

* cited by examiner

Primary Examiner—Donnie L. Crosland
(74) Attorney, Agent, or Firm—MacMillan, Sobanski & Todd, LLC

(57) ABSTRACT

An automatic turn signal deactivation system monitors and deactivates a turn signal indicator for a vehicle. A lane departure warning device compares a vehicle position with an originating roadway lane and provides a monitoring signal to a communication bus. A turn signal module activates the turn signal indicator under manual control and automatically deactivates the turn signal indicator in response to the monitoring signal when the monitoring signal received from the lane departure warning device over the communication bus indicates that a lane change maneuver is complete.

16 Claims, 3 Drawing Sheets

LANE BASED AUTOMATIC TURN SIGNAL DEACTIVATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to turn signal indicators, and more specifically, to deactivation of a turn signal after the occurrence or nonoccurrence of a lane change.

2. Description of the Related Art

A turn signal indicator is utilized for alerting other drivers on a roadway that a lane change or a turn is about to be initiated by a vehicle. When the turn signal indicator is activated, it remains active until the vehicle completes a turn or until a driver manually deactivates the turn signal indicator. When the vehicle completes the turn, deactivation of the turn signal indicator is accomplished by a mechanism associated with a steering column. The mechanism requires that the steering column be rotated passed a certain degree point before deactivation of the turn signal indicator occurs. However, a lane change to an adjacent roadway lane does not usually involve the degree of rotation that would deactivate the turn signal indicator. In many cases, the driver of the vehicle activating the turn signal indicator forgets to deactivate the turn signal indicator after changing lanes. This becomes a concern as other surrounding drivers are uncertain as to the intention of whether a lane change is imminent or not. Certain indicators such as audio or visual awareness signals have been used to alert the driver that the turn signal is active, but audio signals can be drowned out by road or wind noise. Likewise, visual signals located in the display of the dashboard may not be seen by the driver if the driver's attention is focused on the roadway.

Methods used to deactivate the turn signal indicator by estimating whether a lane change has occurred include measuring a predetermined distance traveled by the vehicle after activating the turn signal indicator or measuring the length of time the turn signal has been activated. However, systems such as these only assume that the lane change has been made. There is no verification whether or not the lane change has taken place.

Lane departure or lane tracking systems used primarily in trucking industries to alert drowsy drivers when they are departing from a lane are for detecting a lane departure but these systems are not capable of controlling the deactivation of turn signal indicators; rather, the systems have been used to alert the drowsy driver, usually by an audible signal, that an undesired lane change is occurring. Sensing technology known to detect road position and lane deviation includes sensors using roadway reflective properties, sensors generating image data, accelerometers, and gyroscopes.

SUMMARY OF THE INVENTION

The present invention has the advantage of determining whether a vehicle has performed a lane change and automatically deactivating a turn signal indicator after the lane change is complete.

In one aspect of the invention, an automatic turn signal deactivation system monitors and deactivates a turn signal indicator for a vehicle. A lane departure warning device compares a vehicle position with an originating roadway lane and provides a monitoring signal to a communication bus. A turn signal module activates the turn signal indicator under manual control and automatically deactivates the turn signal indicator in response to the monitoring signal when the monitoring signal received from the lane departure warning device over the communication bus indicates that a lane change maneuver is complete.

DETAILED DESCRIPTION OF PREFERRED EMBODIMENTS

Figure 1:
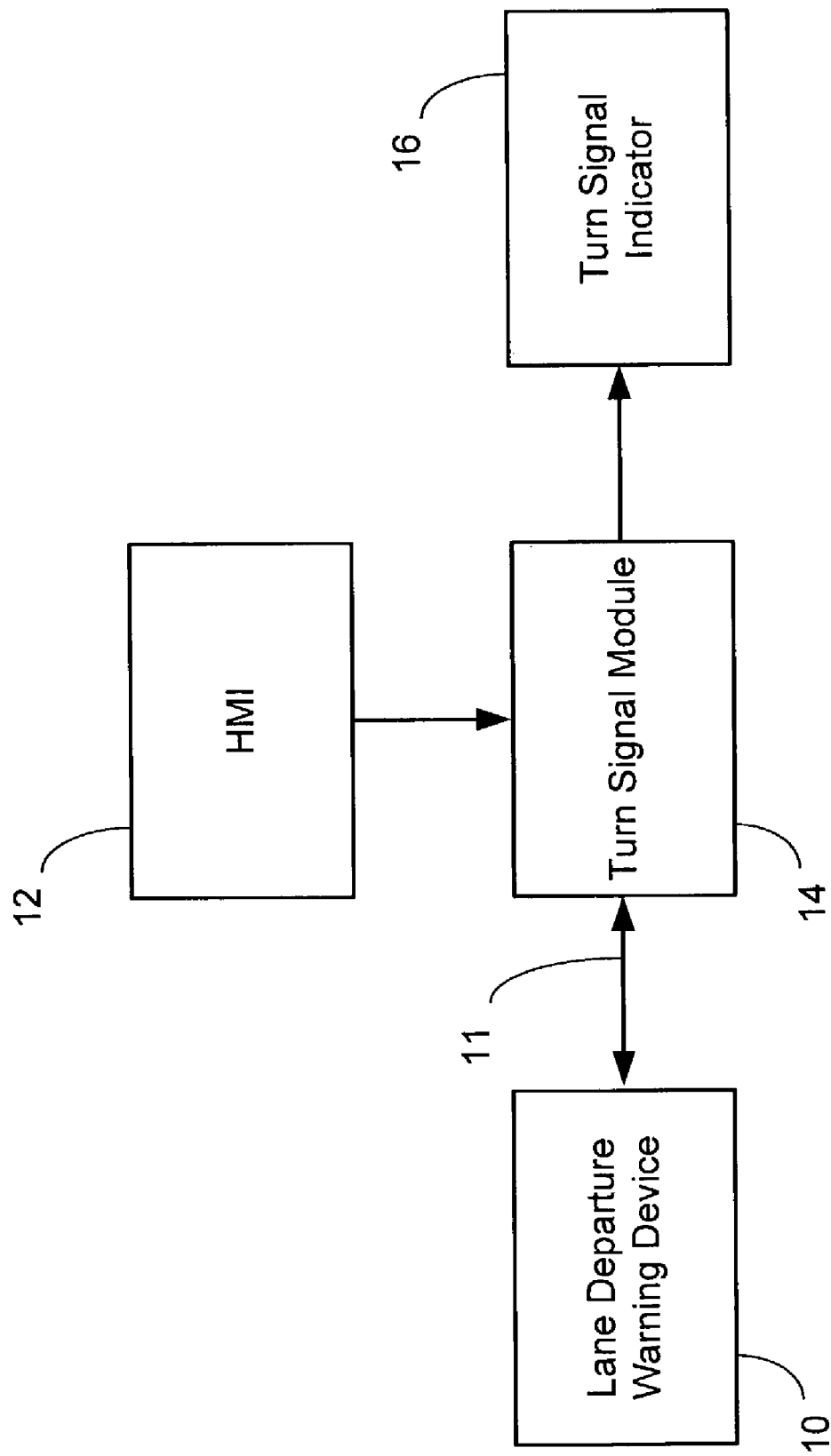
FIG. 1 is a block diagram of a lane based turn signal deactivation system according to the present invention.

Referring now to the Drawings and particularly to FIG. 1, there is shown a block diagram of an automatic turn signal deactivation system. The automatic turn signal deactivation system comprises a lane detection warning device (LDWD) 10 for determining lane position, a turn signal indicator 16 (e.g. an external lamp) for signaling a lane change to other surrounding vehicles, a turn signal module 14 for electronically controlling the activation and deactivation of the turn signal indicator 16, and a human machine interface (HMI) 12 for providing a signal to the turn signal module 14 to activate the turn signal indicator 16. Internal turn signal indicators (not shown) are located within the interior of the vehicle (such as the dashpanel) for notification to the driver that the turn signal indicator 16 is active.

The LDWD 10 is a device that tracks vehicle position relative to lane boundaries of a roadway. In a preferred embodiment, the LDWD includes a lane tracking device similar to a SafeTRAC system supplied by AssistWare Technology, Inc. The LDWD is a vision-based lane tracking system that measures the vehicle position in the lane of the roadway using images of the road ahead with a small video camera (such as a CCD camera) mounted in an interior of the vehicle (such as behind the rear view mirror). However, in alternative embodiments, the LDWD may be mounted in various other locations such as the exterior of the vehicle (e.g., an exterior mirror). The LDWD constantly monitors the lane markings or boundaries of the roadway and tracks the vehicle's position from lane to lane. A lane-lock is present when the vehicle has established vehicle position between the lane markers or boundaries of a lane of a roadway for about a 1 second duration of time. This duration of time is adjustable.

HMI 12 provides a manual activation command to the turn signal module 14. In this embodiment, the HMI 12 is a turn signal switch or multifunction stalk switch attached to a steering column. Alternatively, the HMI 12 can include a wireless command module (such as speech) for providing the manual activation command to the turn signal module 14. The turn signal module 14 receives an input signal from the HMI 12 indicating that the driver desires to activate the turn signal indicator 16. The turn signal module 14 uses momentary switches to activate right or left turn signal indicator lamps. The turn signal module 14 will also provide a signal via a communication bus 11 to the LDWD 10 indicating that the turn signal indicator 16 is active so that the LDWD 10 may give proper feedback to the turn signal module 14 in regards to deactivation of the turn signal indicator 16 as described below.

When a lane change is desired and the turn signal indicator 16 is activated, the LDWD 10 will monitor the progress of a subsequent lane change maneuver. When the LDWD 10 determines that the lane change maneuver is successfully completed by detecting the acquisition and maintenance of a new lane-lock for a first predetermined period of time, a signal will be provided via a communication bus to the turn signal module 14 indicating that the driver has successfully completed the lane change maneuver and that the turn signal indicator 16 should be deactivated. If the driver inadvertently activates the turn signal indicator 16 without desiring to change lanes, the LDWD 10 will monitor the progress of the lane change maneuver and deactivate the turn signal indicator 16 if an originating lane-lock is detected to be maintained for a second predetermined period of time after the activation of the turn signal indicator 16. Likewise, if the driver purposefully activates the turn signal indicator 16 but then decides not to change lanes, the LDWD 10 monitors the progress of the lane change maneuver and deactivates the turn signal indicator 16 if the originating lane-lock is maintained for the second predetermined period of time. However, the driver of the vehicle may manually deactivate the turn signal indicator at any time without the use of the automatic turn signal deactivation system.

Figure 2:
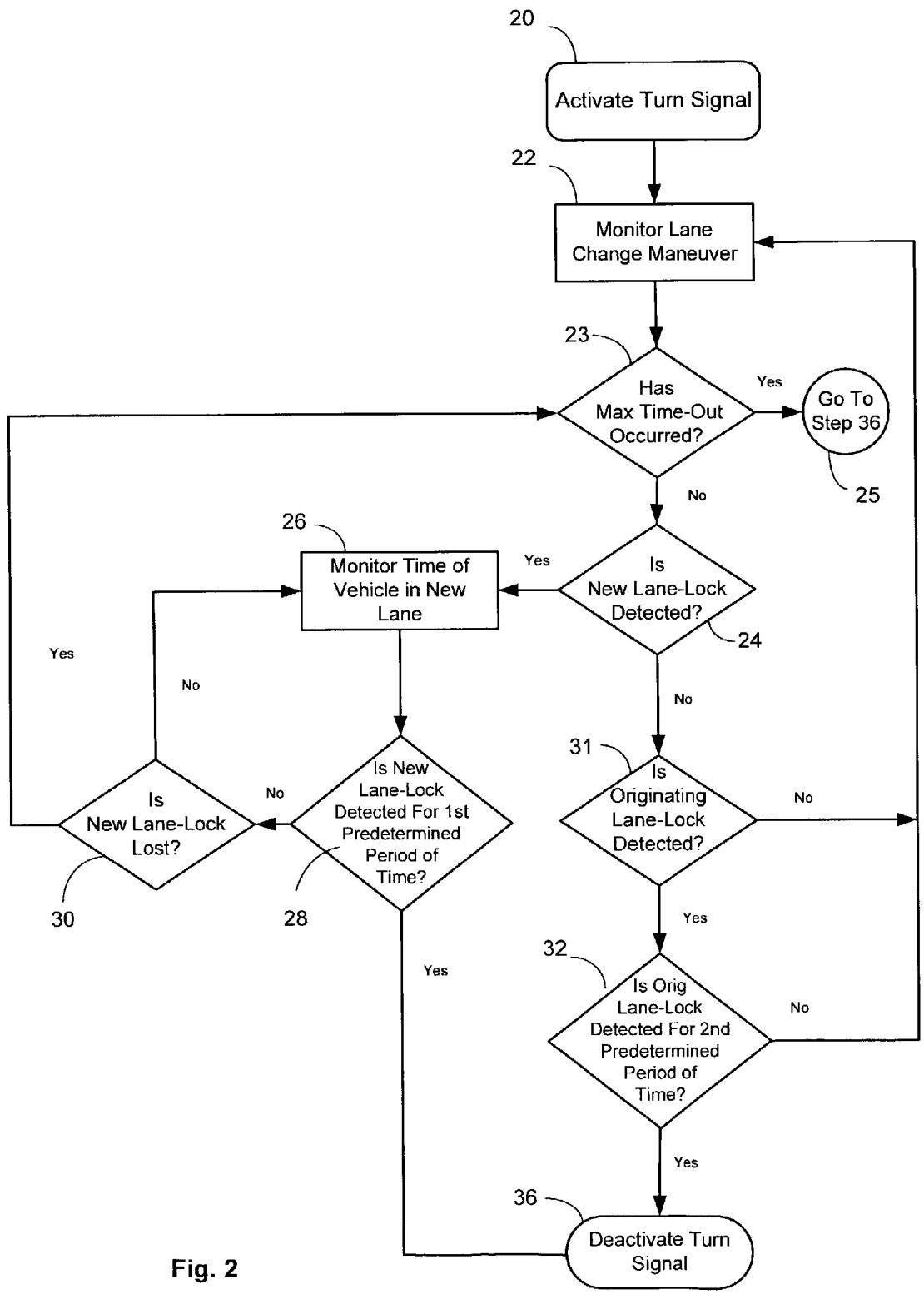
FIG. 2 is a flow diagram of a turn signal deactivation strategy according to a preferred embodiment.

FIG. 2 represents a flow diagram of a turn signal deactivation strategy. In step 20, the driver activates the turn signal indicator. The LDWD is actively tracking vehicle position within and between the lanes of the roadway. In step 22, when the LDWD receives a signal from the turn signal module that the turn signal indicator is active, the LDWD assumes that a lane change is desired and monitors for the lane change maneuver to detect when the new lane-lock occurs. The lane change maneuver includes a departure from an originating roadway lane and an entrance into an adjacent roadway lane. Normally, the activation of the turn signal indicator will occur when the LDWD is lane-locked in the originating roadway lane. When the turn signal indicator is activated while vehicle position is within the originating roadway lane, the LDWD will monitor for the lane change maneuver and the new lane-lock in the adjacent roadway lane. In this situation, the originating lane-lock is lost and is eventually replaced by the new lane-lock in the adjacent lane. However, if the turn signal indicator is activated while the system is between lanes, being that the LDWD is active and has already detected a departure from the originating roadway lane, the LDWD will assume that the lane change maneuver is in progress and monitor for the new lane-lock in the adjacent roadway lane. In step 23, a determination is made whether a maximum time out has occurred. A maximum time-out is used in the event a lane-lock cannot be detected for an extended period of time. In the preferred embodiment, the maximum time-out is about 1 minute from the time the lane-lock is lost while the turn signal is activated. The maximum time-out is an adjustable time limit. If a determination is made in step 23 that a maximum time-out has occurred, then a jump to step 36 is made to deactivate the turn signal indicator.

In step 24, a determination is made whether the new lane-lock has been detected. If the LDWD detects the new lane-lock, then the time the vehicle is in the new lane is measured in step 26. In step 28, a determination is made whether the vehicle is maintained within the adjacent lane for the first predetermined period of time after detecting the new lane-lock. In the preferred embodiment, the first predetermined period of time is about 1 second. However, the duration of the first predetermined period of time is adjustable. If the LDWD determines that the vehicle has maintained the vehicle position within the adjacent roadway lane for the first predetermined period of time in step 28, then the LDWD provides a signal over a communication bus or the like to the turn signal module to deactivate the turn signal indicator in step 36. If a determination is made in step 28 that the vehicle position is not maintained for the first predetermined time, then a check is made in step 30 to determine whether the new lane-lock is lost and if the vehicle is deviating from the new lane. If the LDWD determines that the new lane-lock is not lost in step 30, a return is made to step 26 to measure the time the vehicle is in the adjacent roadway lane. If the LDWD determines that the new lane-lock is lost in step 30, then a return is made to step 24 to determine if the new lane-lock for a next adjacent roadway lane is detected.

In step 24, if the determination is made that the new lane-lock is not detected, then a determination is made in step 31 whether the originating lane-lock is detected. If the originating lane-lock is not detected, then a return to step 22 is made to continue to monitor the lane change maneuver and determine if a maximum time-out has occurred. If the originating lane-lock is detected in step 31, a determination is made in step 32 whether the vehicle has maintained the originating lane-lock for the second predetermined period of time. In the preferred embodiment, the second predetermined period of time is 10 seconds, although this duration is adjustable. If the second predetermined period of time has not elapsed in step 32, then a return is made to step 22 to continue to monitor the lane-lock status. If a determination is made that the second predetermined period of time has elapsed in step 32, then the LDWD provides a signal to the turn signal module to deactivate the turn signal indicator in step 36.

Figure 3:
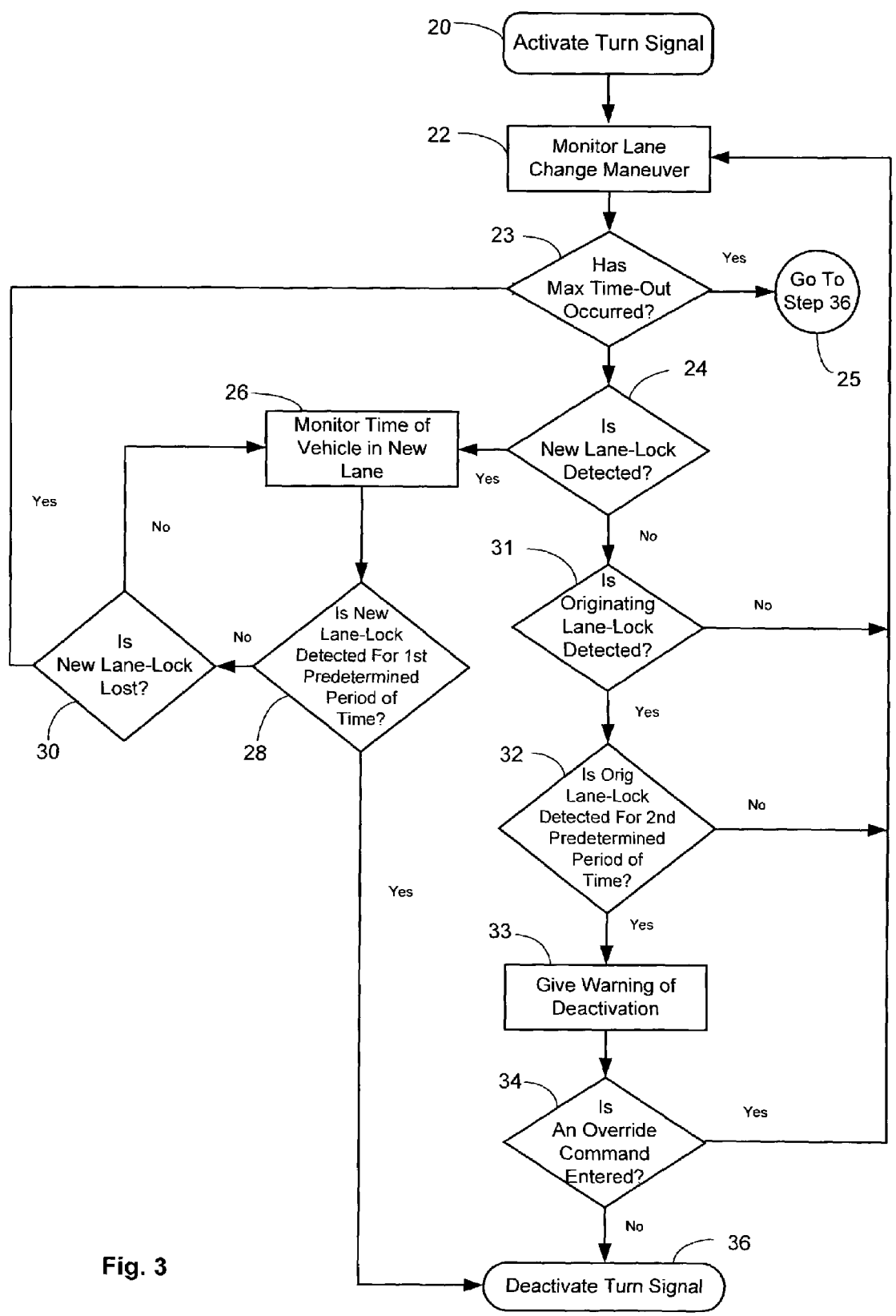
FIG. 3 is a flow diagram of a turn signal deactivation strategy according to a second preferred embodiment.

FIG. 3 represents a flow diagram for a turn signal deactivation strategy according to a second preferred embodiment. The steps for the turn signal deactivation strategy are the same as that shown in FIG. 2 with the addition of steps 33 and step 34. In the second preferred embodiment, the determination is made in step 24 if the new lane-lock is detected. If the new-lane lock is not detected in step 24, then the determination is made in step 31 whether the originating lane-lock is detected. If the originating lane-lock is detected in step 31 then a determination is made whether the vehicle has maintained the originating lane-lock for the second predetermined period of time in step 32. If the determination is made that the vehicle has maintained the original lane-lock in step 32 for the second predetermined period of time, then a warning is given to the driver in step 33 that the turn signal indicator is about to be deactivated. In the event that the driver still desires to change lanes but has not done so due to circumstances out of his control, such as heavy traffic in the adjacent roadway lane, then the driver can override the turn signal deactivation by performing a predetermined control operation to initiate an override command. An example of a control operation includes a push button on the stalk switch or dashpanel, or spoken command using voice recognition. The override command will reset the second predetermined period of time to allow the driver additional time to change lanes while the turn signal indicator remains active. In step 34, a determination is made whether the override command has been entered. If the override command is initiated, a return to step 27 is made and the LDWD will monitor for a lane change maneuver. If the a determination is made in step 34 that the override command is not entered, then the LDWD provides a signal to the turn signal module to deactivate the turn signal indicator in step 36.

What is claimed is:

1. An automatic turn signal deactivation system for monitoring and deactivating a turn signal indicator for a vehicle comprising:
   a lane departure warning device for comparing a vehicle position with an originating roadway lane and for providing a monitoring signal to a communication bus; and
   a turn signal module for activating said turn signal indicator under manual control and for automatically deactivating said turn signal indicator in response to said monitoring signal wherein said monitoring signal received from said lane departure warning device over said communication bus indicates a lane change maneuver is complete.

2. The system of claim 1 wherein said lane change maneuver includes a departure from said originating roadway lane and an entrance into an adjacent roadway lane.

3. The system of claim 1 wherein said turn signal module deactivates said turn signal indicator after a first predetermined period of time after receiving said monitoring signal from said lane departure warning device indicating said completion of said lane change maneuver.

4. The system of claim 1 wherein said turn signal module deactivates said turn signal indicator if said monitoring signal indicates said originating roadway lane is maintained for a second predetermined period of time.

5. The system of claim 4 further comprising a control for entering an override command wherein said override command resets said second predetermined period of time.

6. The system of claim 5 wherein said control for entering said override command is a manual operation performed by an occupant of the vehicle.

7. The system of claim 1 further comprising a human machine interface (HMI) for providing a manual activation command to said turn signal module for activating said turn signal indicator.

8. The system of claim 7 wherein said HMI includes a turn signal switch for providing said manual activation command to said turn signal module for activating said turn signal indicator.

9. The system of claim 7 wherein said HMI includes a wireless command module for providing a manual activation command to said turn signal module for activating turn signal indicator.

10. The system of claim 1 further comprising a receiver for receiving a wireless command for activating said turn signal indicator.

11. The system of claim 1 wherein said lane departure warning device comprises a vision based system to determine said lane change maneuver.

12. The system of claim 1 wherein said lane departure warning device is mounted in an interior of said vehicle.

13. A method for monitoring and deactivating a turn signal of a vehicle, the method comprising the steps of:
   monitoring for an activation of a turn signal indicating a lane change maneuver;
   monitoring for said lane change maneuver with a lane change detection device;
   determining if said lane change maneuver is complete;
   if said lane change maneuver is determined to be complete, then deactivating said turn signal after a first predetermined period of time; and
   if said lane change maneuver is determined not to be complete, then deactivating said turn signal after a second predetermined period of time.

14. The method of claim 13 further comprising the step for entering an override command wherein said override command resets said second predetermined period of time.

15. The method of claim 13 wherein said lane departure detection device comprises a vision based system for determining said lane change maneuver.

16. The method of claim 13 wherein said lane departure detection device is mounted in an interior of said vehicle.

* * * * *